Figure 1:
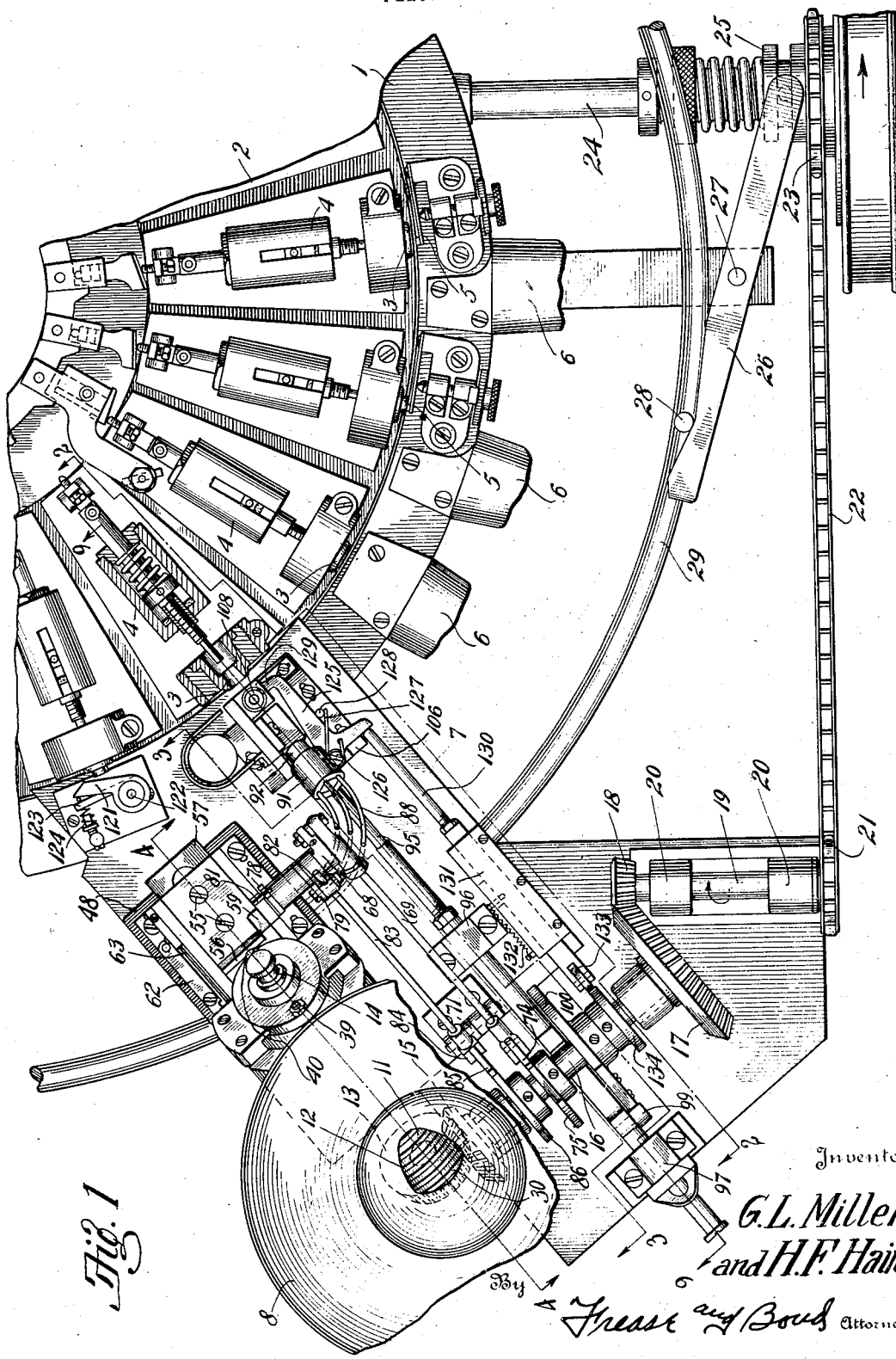

March 30, 1926.  1,578,458

G. L. MILLER ET AL

AUTOMATIC FEED FOR GAUGING APPARATUS

Filed Feb. 11, 1924  10 Sheets-Sheet 1

Inventors
G. L. Miller
and H. F. Haines
By Frease and Bond Attorneys

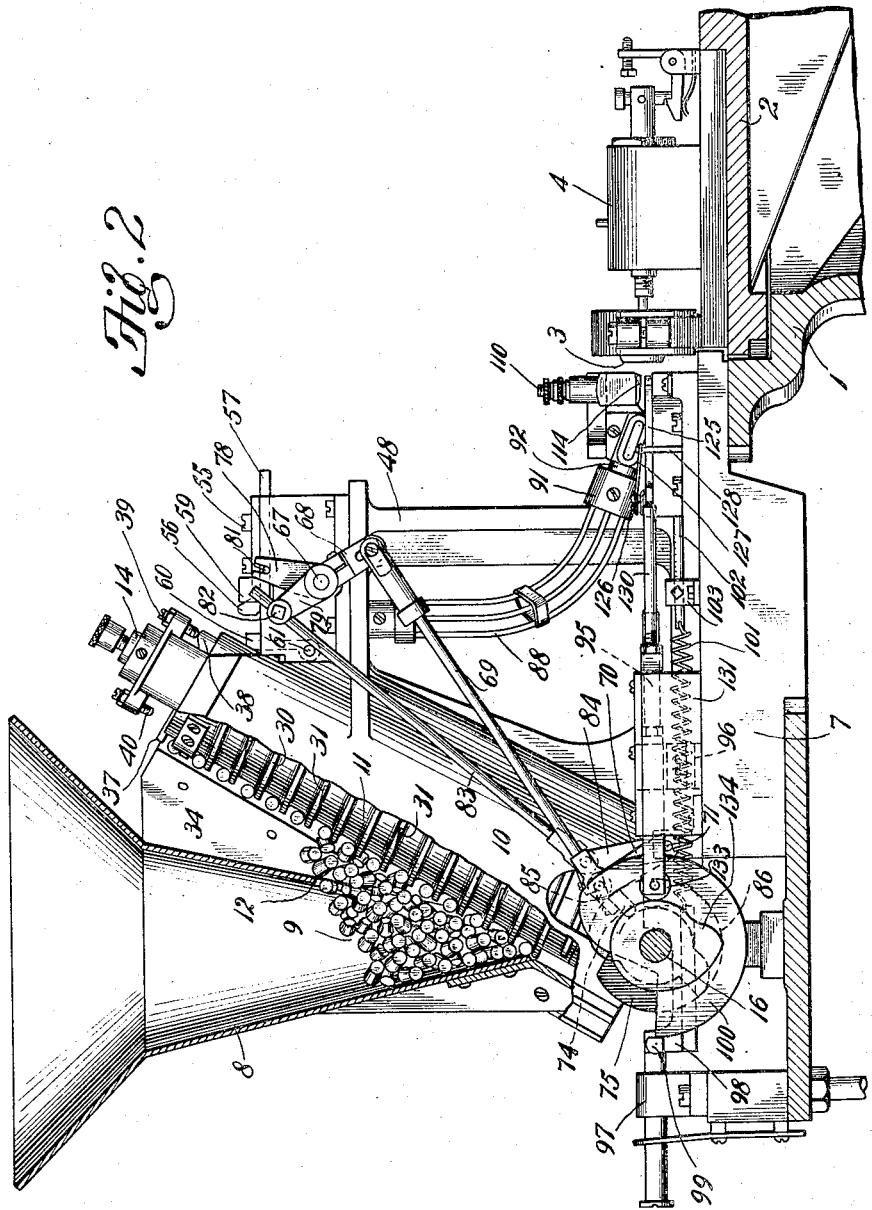

March 30, 1926. 1,578,458
G. L. MILLER ET AL
AUTOMATIC FEED FOR GAUGING APPARATUS
Filed Feb. 11, 1924    10 Sheets-Sheet 3
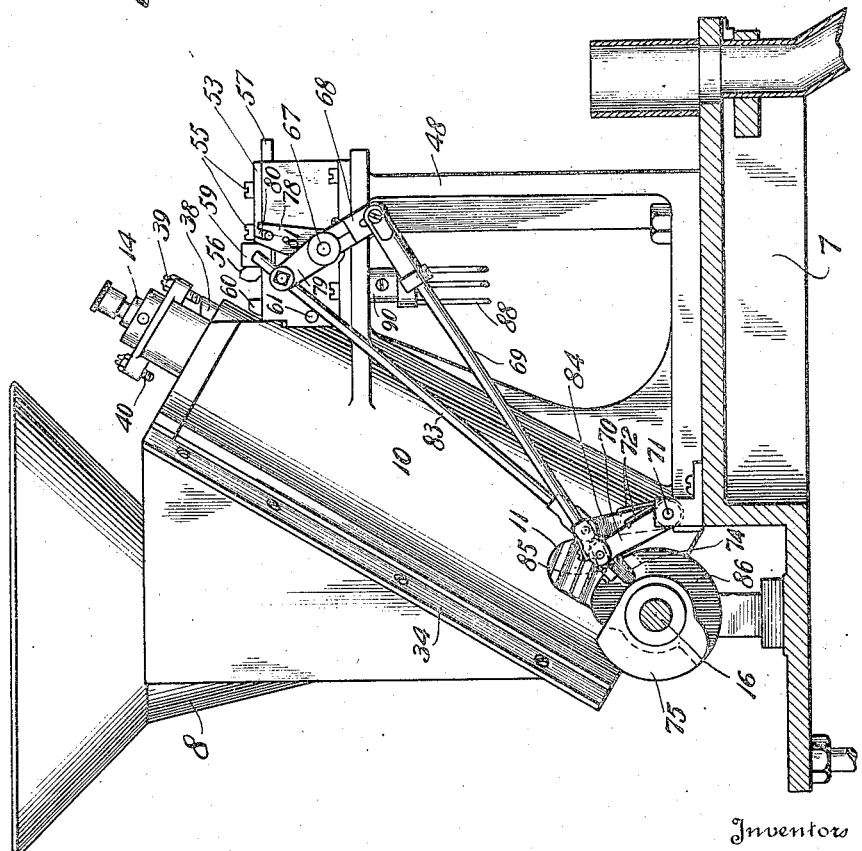
Inventors
G. L. Miller and
H. F. Haines
By Frease and Bond
Attorneys

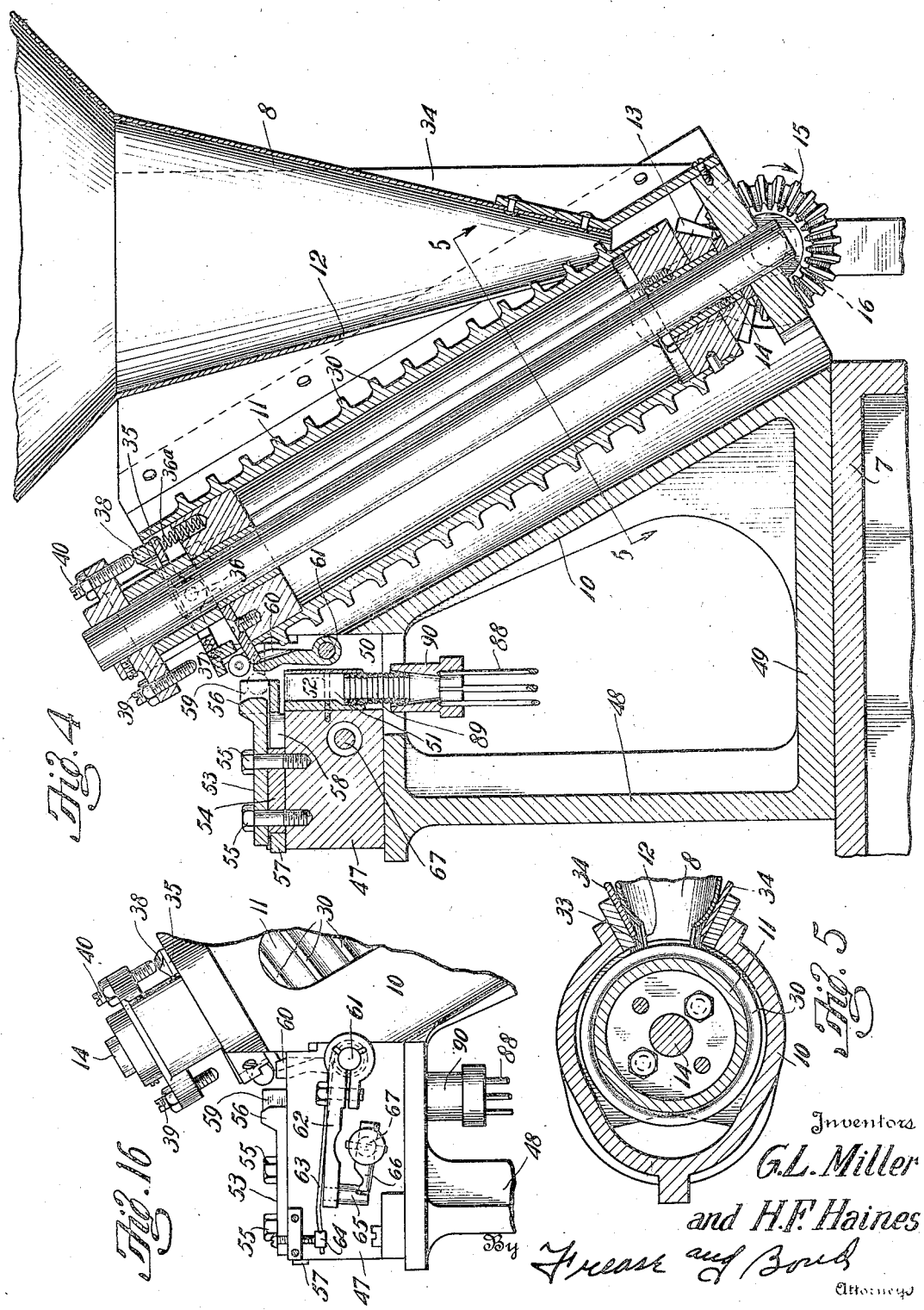

March 30, 1926.
G. L. MILLER ET AL
1,578,458
AUTOMATIC FEED FOR GAUGING APPARATUS
Filed Feb. 11, 1924   10 Sheets-Sheet 5
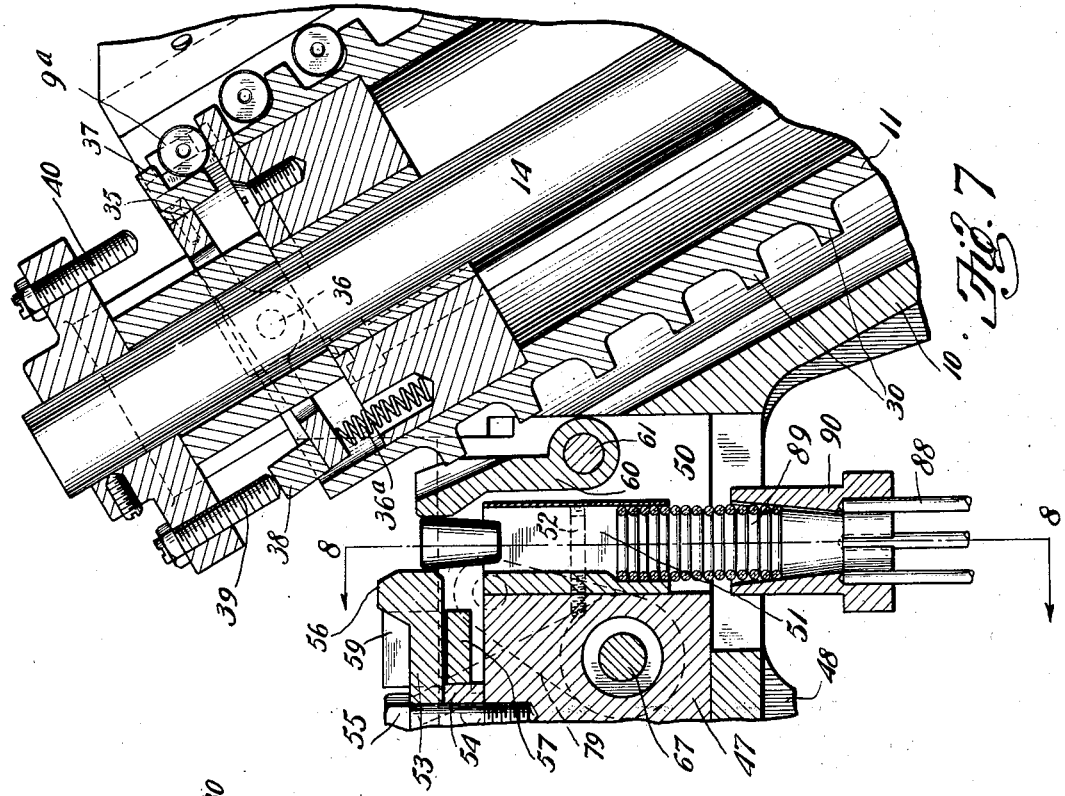
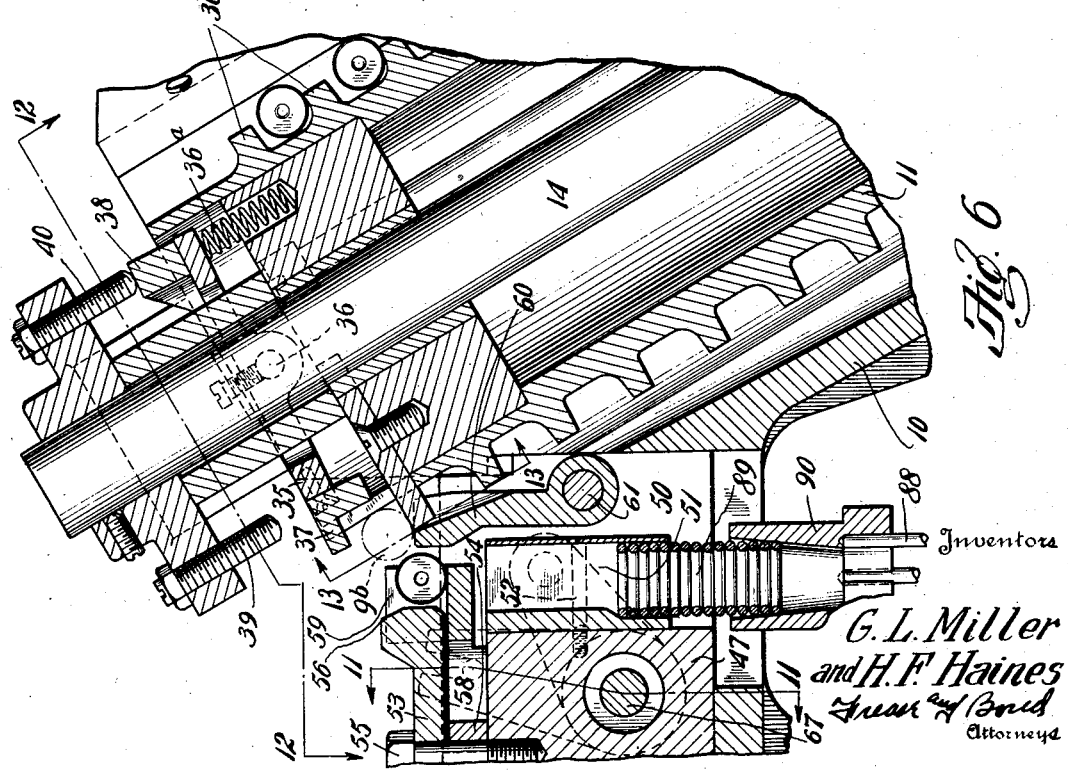
Inventors
*G. L. Miller*
*and H. F. Haines*
Attorneys March 30, 1926.
G. L. MILLER ET AL
1,578,458
AUTOMATIC FEED FOR GAUGING APPARATUS
Filed Feb. 11, 1924      10 Sheets-Sheet 6
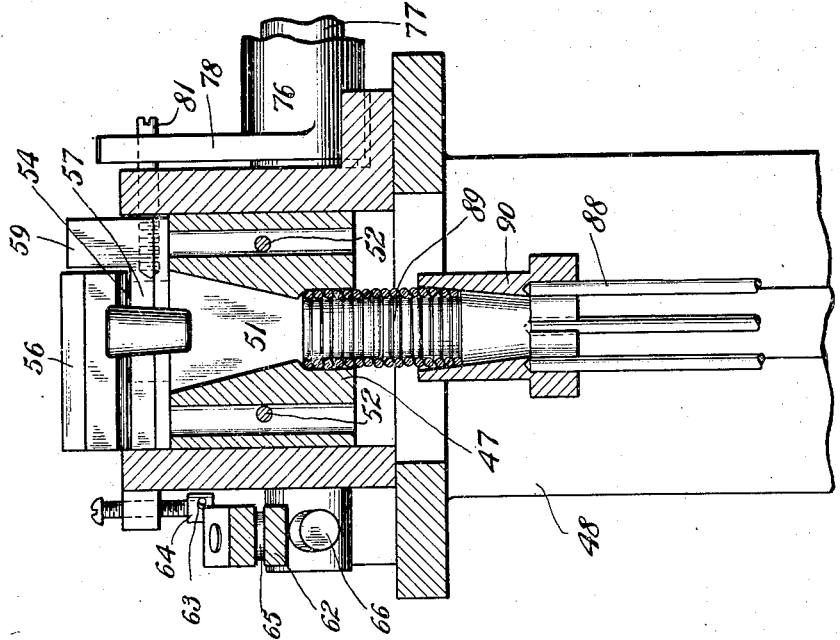
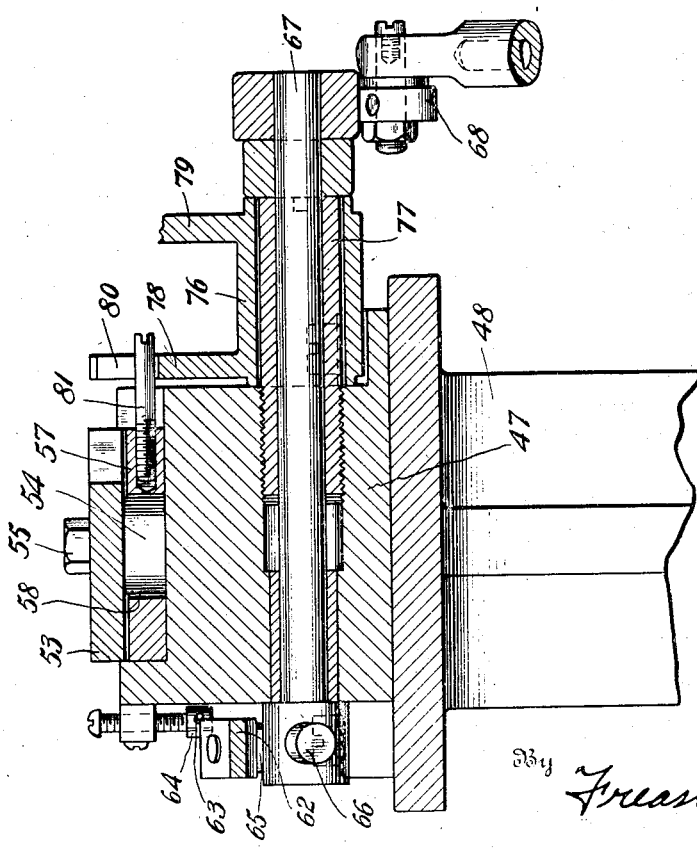
Inventors
G. L. Miller and
H. F. Haines
By Frease and Bond
Attorneys March 30, 1926. 1,578,458
G. L. MILLER ET AL
AUTOMATIC FEED FOR GAUGING APPARATUS
Filed Feb. 11, 1924 10 Sheets-Sheet 7
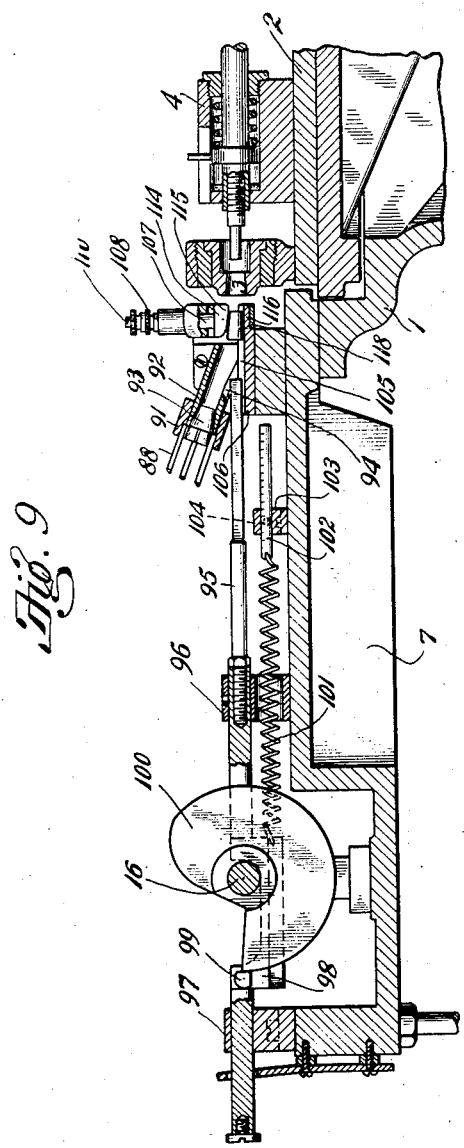
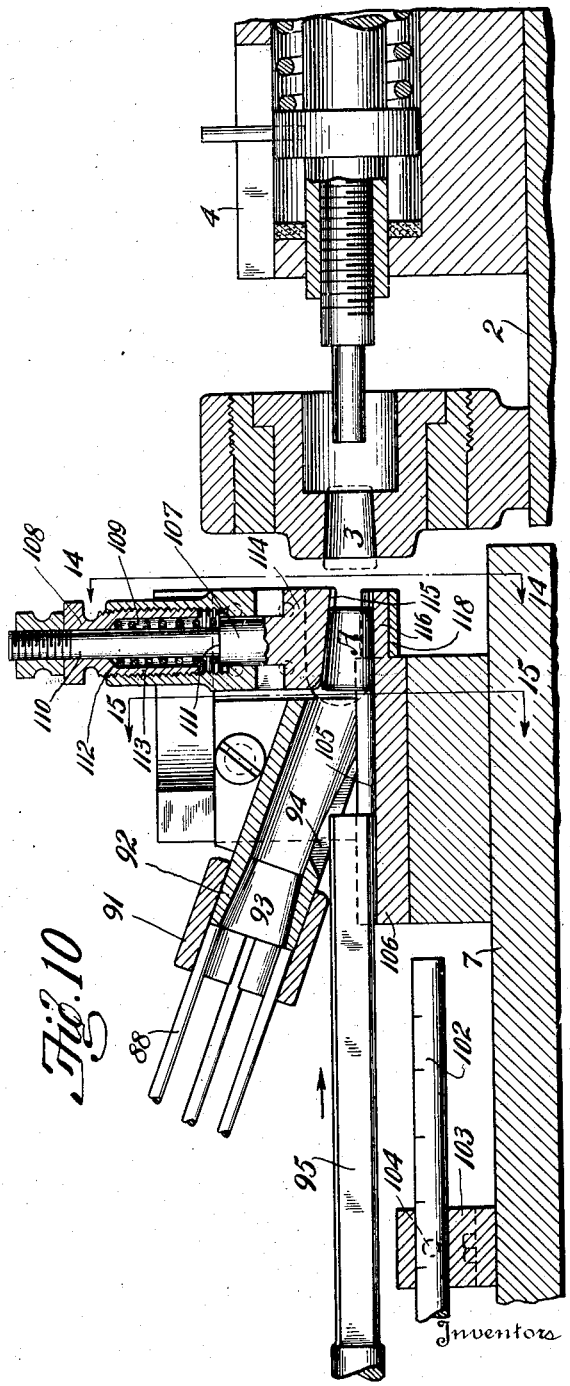
Inventors
G.L. Miller and
H.F. Haines
By
Attorneys March 30, 1926.  
G. L. MILLER ET AL  
1,578,458  
AUTOMATIC FEED FOR GAUGING APPARATUS  
Filed Feb. 11, 1924  
10 Sheets-Sheet 8

Inventors  
G. L. Miller and  
H. F. Haines.  
By Frease and Bond  
Attorneys

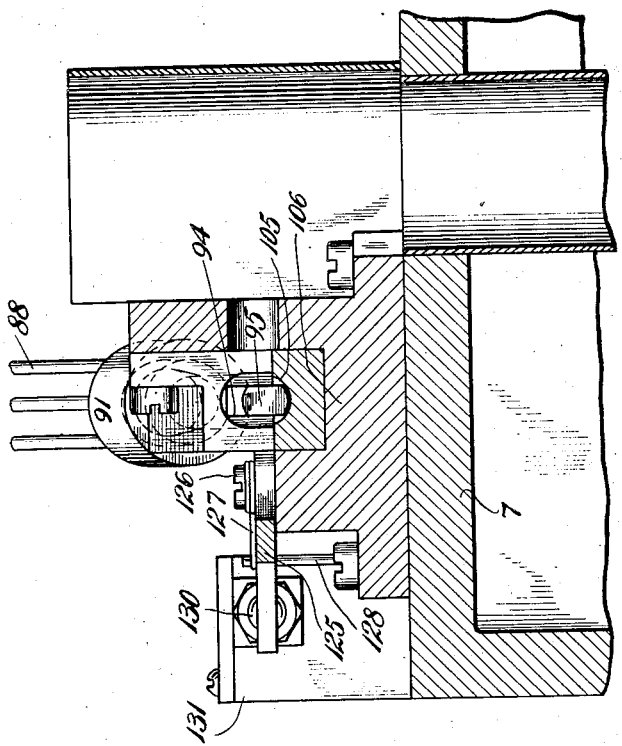
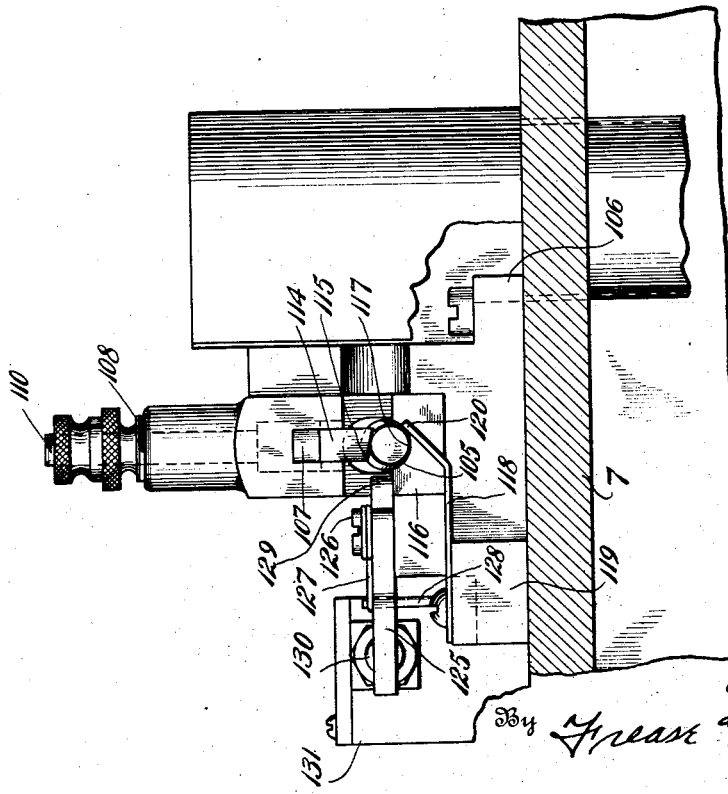

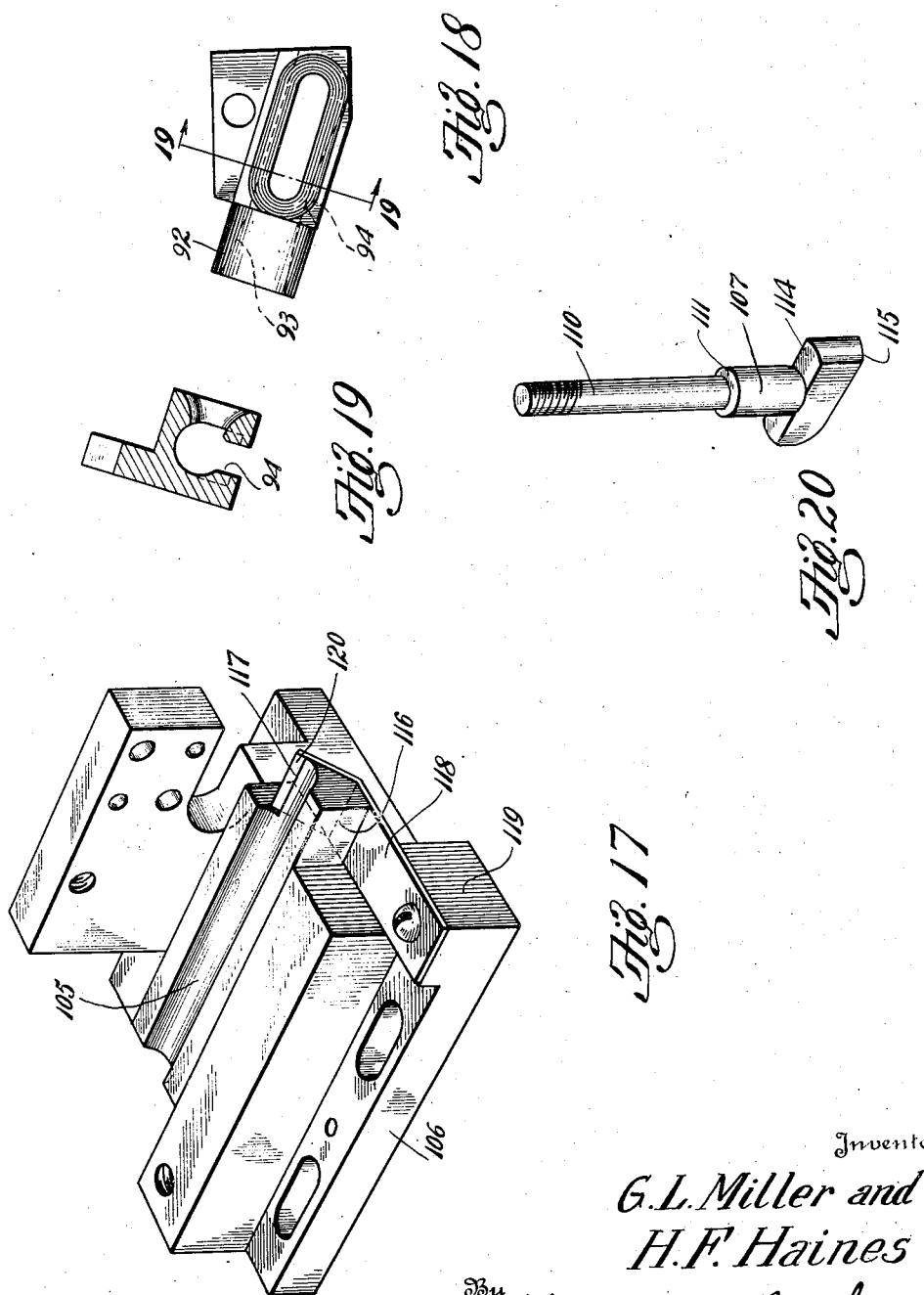

Patented Mar. 30, 1926.

1,578,458

UNITED STATES PATENT OFFICE.

GEORGE LEE MILLER AND HARRY F. HAINES, OF CANTON, OHIO, ASSIGNORS, BY MESNE ASSIGNMENTS, TO THE TIMKEN ROLLER BEARING COMPANY, OF CANTON, OHIO, A CORPORATION OF OHIO.

AUTOMATIC FEED FOR GAUGING APPARATUS.

Application filed February 11, 1924. Serial No. 692,019.

*To all whom it may concern:*

Be it known that we, GEORGE LEE MILLER and HARRY F. HAINES, both citizens of the United States, and both residing at Canton, in the county of Stark and State of Ohio, have invented certain new and useful Improvements in Automatic Feeds for Gauging Apparatus, of which the following is a specification.

This invention relates to an automatic feed for feeding taper pieces to a gauging apparatus of the kind illustrated in Patent No. 1,367,199 to George L. Miller, February 1, 1921.

In accordance with the method of gauging taper pieces as carried out in the above mentioned patent, the taper rollers are introduced into accurately prepared taper sockets from which they project, and the projecting ends are carried past a series of graduated gauge members which serve as contact points for electric circuits which control the discharge of the rollers from the sockets.

A very slight variation in the diameter of the roller will make a very considerable difference in the distance which the roller will project from the socket; therefore, by this method it is possible to obtain great accuracy in assorting the rollers, without the necessity of the utmost accuracy in the construction of the apparatus for effecting this result.

The taper rollers are introduced into the master sockets carried by the rotating table and are thus carried past an annular series of gauge members which serve as contact points for electric circuits; and are discharged, in assorted condition, into an annular series of receptacles, the discharge being effected by means of spring pressed plungers associated with the sockets, the operation of the plungers being controlled by the electric circuits.

The object of the invention is to provide an automatic feeding mechanism for introducing the taper pieces into the master sockets carried by the rotating table of the gauging machine above referred to.

An embodiment of the invention is illustrated in the accompanying drawings, in which—

Figure 12:
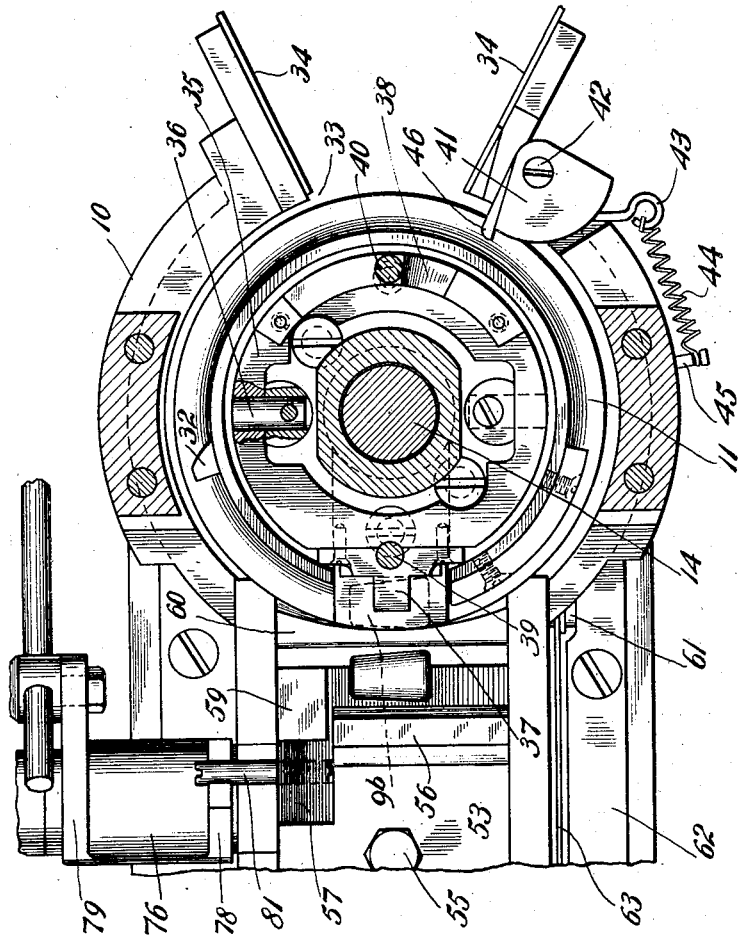
Figure 13:
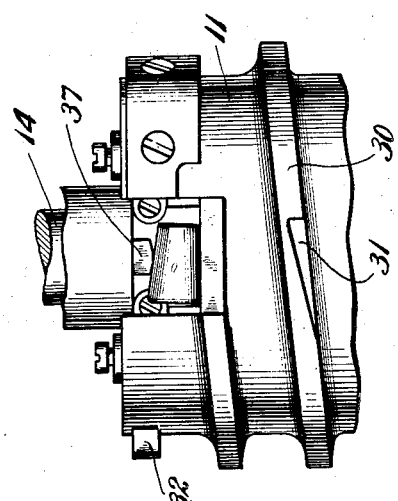

Figure 1 is a plan view of the feeding mechanism and the adjacent portion of the gauging apparatus, parts being broken away for the purpose of illustration;

Fig. 2, a section on the line 2—2, Fig. 1;
Fig. 3, a section on the line 3—3, Fig. 1;
Fig. 4, a section on the line 4—4, Fig. 1;
Fig. 5, a section on the line 5—5, Fig. 4;
Fig. 6, an enlarged vertical sectional view of the turning mechanism and the upper end of the feed screw, showing a taper piece entering the turning mechanism;
Fig. 7, a view similar to Fig. 6, showing the taper piece turned and in position to be released;
Fig. 8, a section on the line 8—8, Fig. 7;
Fig. 9, a section on the line 9—9, Fig. 1;
Fig. 10, an enlarged sectional view showing a portion of the mechanism illustrated in Fig. 9;
Fig. 11, a section on the line 11—11, Fig. 6;
Fig. 12, a section on the line 12—12, Fig. 6;
Fig. 13, a section on the line 13—13, Fig. 6;
Fig. 14, a section on the line 14—14, Fig. 10;
Fig. 15, a section on the line 15—15, Fig. 10;
Fig. 16, a fragmentary elevation on an enlarged scale of the turning mechanism and the upper end of the feed screw;
Fig. 17, a detail perspective view of the block at the lower end of the feed chute;
Fig. 18, an elevation of the mouth of the feed chute;
Fig. 19, a section on the line 19—19, Fig. 18; and
Fig. 20, a detail perspective view of the holding plunger.

Similar numerals refer to similar parts throughout the drawings.

The gauging machine with which the feeding mechanism embodying the invention is associated, comprises a frame 1, in which is rotatably mounted the rotary table to which carries at or near its periphery an annular series of sockets 3 and associated therewith an annular series of roller ejecting devices 4.

An annular series of gauge members 5 are mounted on the frame adjacent to the path of movement of the projecting ends of rollers mounted in the sockets 3, these gauge members being located in electric circuits of a series of circuit controlling solenoids, which are illustrated and described in the patent above mentioned. An annular series of discharge conduits 6 are mounted upon the frame to receive the rollers as they are ejected from the sockets.

The present invention pertains to the feeding means by which the rollers are automatically fed to the master sockets 3 as the rotary table is rotated, and, therefore, it is not thought necessary to further illustrate the gauging machine per se, only a sufficient portion of the same being illustrated and described to show the action of the feeding mechanism thereto.

The feeding mechanism may be mounted upon a platform 7 rigidly connected to the frame 1. A hopper 8 is mounted upon the platform 7 for the purpose of initially receiving the rollers as shown at 9, said hopper being preferably supported by the casing 10 of the angularly disposed lifting screw 11, said casing being directly connected to the platform in any suitable manner.

The lower portion of the hopper 8 is cut away as at 12 upon the side face of the lifting screw, in order that the rollers may pass through the same and be engaged by the screw. A bevel pinion 13 is fixed upon the lower end of the shaft 14 of the lifting screw and meshes with a pinion 15 mounted upon a horizontal shaft 16, the outer end of which may be provided with the bevel gear 17 meshing with a bevel pinion 18 upon the shaft 19, journaled in bearings 20 carried by the platform 7.

A sprocket wheel 21 is provided upon the shaft 19 and connected by the chain 22 with a sprocket wheel 23 upon the drive shaft 24 which may also drive the rotary table as disclosed in the patent above mentioned.

A clutch 25 may be provided upon the shaft 24 and the operating lever 26 of the clutch may be pivoted intermediate its extremities as at 27 and the free end thereof arranged to be engaged by the stud 28 upon the ring 29 surrounding the gauging machine, whereby the operator by grasping the ring and rotating the same slightly, may stop or start the machine from any position adjacent thereto.

The thread 30 of the lifting screw is notched at intervals as shown at 31, in order that any roller which might accidentally be caught by the screw in a position parallel to the longitudinal axis of the screw, will be knocked down by engagement with one of said notches.

The rollers are carried by the screw in the position shown in Fig. 2, and a lug 32 (Fig. 13) is provided at the upper end of the screw for knocking down any rollers which may be accidentally carried to the top of the screw in an upright position.

It will be seen that the casing 10 of the lifting screw is open upon the side toward the hopper as indicated as indicated at 33, the flared side walls 34 extending outward from said opening to the hopper.

At the upper end of the lifting screw is provided a rocking clamp plate 35 pivoted as at 36 upon the shaft of the screw and provided at one side with a jaw 37 for engagement with the rollers, a cam 38 being provided upon the other side thereof for engagement with the studs 39 and 40.

As each roller is brought to the top of the screw in the position indicated at $9^a$ in Fig. 7, the cam 38 passes beneath the stud 39, opening the jaw 37 to receive the roller which is immediately clamped by the jaw through the action of the spring $36^a$, and carried to the position indicated in dotted lines at $9^b$ in Fig. 6, when the cam 38 passing beneath the stud 40 raises the jaw 37, releasing the roller.

For the purpose of properly positioning each roller as it is received beneath the jaw 37, a segment 41 is pivoted as at 42 upon the upper end of the screw casing and provided with an arm 43 connected by a spring 44 to a rigid portion of the casing as by the pin 45.

Thus as each roller is entered into position beneath the jaw 37, the forward end of the roller will engage the face 46 of the segment, turning the same against the action of the spring 44 and placing the roller in proper position beneath said jaw.

A block 47 is supported upon the upper end of a standard 48 which may be mounted upon or formed integrally with the base 49 to which the screw casing is connected. A vertical channel 50 is formed through the forward side of the block 47, a short tube 51 being mounted in said channel as by the screw 52.

A cover plate 53 is spaced above the block 47 by means of a filler block 54, screws 55 being located through said cover and filler block to attach the same to the block 47. The plate 53 terminates just above the edge of the tube 52, in a bevelled flange 56.

A sliding gate 57 is mounted between the block 47 and cover plate 53, being provided with an elongated slot 58 to permit longitudinal movement of the gate, an end flange 59 being provided at the forward portion of the gate to prevent the rollers from being accidentally displaced.

A rocker arm 60 is fixed upon a rocker shaft 61 located through the channel portion of the block 47 and provided upon its outer end with a rocker arm 62 to which a leaf spring 63 is connected, the free end thereof being engaged by an adjusting screw 64.

A shouldered stud 65 depends from the free end of the rocker arm 62 and is arranged to be engaged by the rocker arm 66 fixed upon the rocker shaft 67.

A rocker arm 68 is fixed upon the shaft 67 and pivotally connected by a link 69 to a lower rocker arm 70 pivoted as at 71 to the base, a spring 72 being provided for holding the fiber point 74 in engagement with the cam 75.

A tubular shaft 76 is journaled upon the bushing 77 surrounding the shaft 67 and has the rocker arms 78 and 79 fixed thereto. The arm 78 is provided with the radial slot 80 at its upper end which receives the stud 81 upon the sliding gate 57.

The arm 79 is pivotally connected as at 82 to the link 83, the lower end of which is pivoted to a rocker arm 84 provided with a fiber point 85 engaging the cam 86 fixed upon the shaft 16, which also carries the cam 75.

As each roller is released from the jaw 87 the sliding gate 57 is in the position shown in Figs. 4 and 6, retaining the roller thereon in horizontal position, the rocker arm 60 being in the backward or inoperative position.

As the sliding gate is moved forwardly, the rocker arm 60 is rocked in the same direction, engaging the larger end of the roller between said rocker arm and the flange 56 of the plate 53. The sliding gate 57 is meanwhile withdrawn, permitting the roller to drop, with the small end downward, directly over the tube 51.

A chute 88, which may consist of a plurality of curved rods, is connected to the lower end of the tube 51 as by the flexible tube 89 inserted into the lower end of the tube 51 and into the conical upper end of the collar 90 upon the upper end of the chute.

This chute is curved downward and provided at its lower end with the collar 91 to which is connected the inclined tube 92, the interior of which is flared upwardly from a point near the upper end as at 93, the under side of said tube being cut away as shown at 94 to permit the entrance of the plunger 95.

This plunger is slidably located through the bearings 96 and 97 and provided intermediate said bearings with a depressed portion 98 to accommodate the shaft 16. A lug 99 is provided upon the plunger arranged to be normally held in engagement with the cam 100 by means of the spring 101.

For the purpose of adjusting the tension upon the spring, the free end of the same is connected to a graduated rod 102 located through a bearing 103 and arranged to be held in adjusted position therein as by a set screw 104.

The free end of the plunger is arranged to be reciprocated in the channel 105 formed in the block 106 which is fixed upon the base of the feeding mechanism.

As each roller passes down the chute, small end first, it passes into the groove 105 in the block 106 and beneath the spring pressed plunger 107 which holds the roller in the position shown at A in Fig. 10.

This plunger is mounted in a vertical bearing 108 supported from the block 106, a coil spring 109 being located around the stem 110 of the plunger between the shoulder 111 upon the lower portion of the stem and the upper end 112 of the socket 113 in the bearing portion. The head 114 of the plunger is provided with the inclined grooved under surface 115 shaped to conform to the rollers.

As best shown in Fig. 17, the channel portion of the block 106 is projected outward beyond the edge of the block as shown at 116 and cut away upon one side as shown at 117, a leaf spring 118 being connected to a lug 119 upon the block, the free end of the leaf spring extending upward at an angle beyond the cut-out portion of the channel, as shown at 120.

As each socket 3 registers with the roller as shown in Fig. 10, the plunger 95 is moved in the direction of the arrow in said figure, through the action of the cam 100, striking the rear end of the roller and projecting the same into the socket 3, and as the same is carried beneath the spring pressed wiper arm 121 mounted to swing about a vertical pivot 122 carried by the frame and provided with an integral arm 123 which is pressed outward by a spring 124, the roller is forced tightly into the socket.

A bell crank lever 125 is pivoted as at 126 upon the base, a spring 127 being provided for normally holding the same in engagement with the stop pin 128. The forward end of the bell crank is provided with the finger 129 arranged to be moved across the path of each roller after the operation of the plunger 95.

For the purpose of rocking this bell crank lever, a rod 130 is slidably mounted in a bearing 131 fixed upon the base, a spring 132 holding the roller 133 upon the rear end of said rod in engagement with the cam 134 upon the shaft 16.

Thus if for any reason a roller becomes caught in the feeding device, and is not properly forced into the socket by means of the plunger 95, the operation of the bell crank 125 will dislodge the roller to prevent the machine from becoming jammed, the roller being ejected through the cut-out portion 117 of the channel block, the leaf spring 120 being depressed as the roller passes over the same.

From the above, it will be obvious that the rollers are automatically carried upward by the screw conveyor from the hopper and are one at a time deposited upon the sliding gate 57 and turned, small end down, and released, passing downward through the chute and ejected from the feeding mechanism by means of the plunger 95 which automatically places a roller in each socket 3 as the gauging mechanism is rotated.

We claim:—

1. A feeding device of the character described, including a sliding gate, a stationary plate above the gate, a movable member spaced from the end of the stationary plate adjacent to the end of the sliding gate, means for depositing a taper roller upon the gate and means for withdrawing the gate from beneath the roller and moving the movable member into engagement with the large end of the roller to bind the same between the end of the stationary plate and the movable member, permitting the roller to swing into vertical position with the small end downward.

2. A feeding device for feeding taper rollers, including a screw for elevating the rollers, clamping means upon the upper end of the screw for clamping each roller as it reaches the upper end of the screw, means for automatically releasing the clamping means, and turning means adapted to receive each roller from the clamping means and to turn the roller with the small end downward, an outwardly directed chute through which the roller is adapted to be passed, small end first, and means for automatically ejecting the roller at a predetermined time.

3. A feeding device for feeding taper rollers, including a screw for elevating the rollers, clamping means upon the upper end of the screw for clamping each roller as it reaches the upper end of the screw, means for automatically releasing the clamping means, and turning means adapted to receive each roller from the clamping means and to turn the roller with the small end downward, an outwardly directed chute through which the roller is adapted to be passed, small end first, means at the lower end of the chute for temporarily detaining the roller and means for automatically ejecting the roller from the detaining means at a predetermined time.

4. A feeding device for feeding taper rollers, including a screw for elevating the rollers, clamping means upon the upper end of the screw for clamping each roller as it reaches the upper end of the screw, means for automatically releasing the clamping means, and turning means adapted to receive each roller from the clamping means and to turn the roller with the small end downward, an outwardly directed chute through which the roller is adapted to be passed, small end first, and a plunger for automatically ejecting the roller at a predetermined time.

5. A feeding device for feeding taper rollers, including a hopper adapted to contain taper rollers and provided with a channel portion, an elevating screw extending into said channel portion and adapted to convey taper rollers from the hopper through said channel portion thereof, clamping means at the upper end of the screw for receiving each roller, means for releasing said clamping means, a turning device adapted to receive each roller as it is released by the clamping means and turn the same with the small end down, means for conveying each roller, the smaller end first, away from the turning device and means for ejecting each roller from the feeding device at a predetermined time.

6. A feeding device for feeding taper rollers, including a hopper adapted to contain taper rollers and provided with a channel portion, an inclined elevating screw extending into said channel portion and adapted to convey taper rollers from the hopper through said channel portion thereof, clamping means at the upper end of the screw for receiving each roller, means for releasing said clamping means, a turning device adapted to receive each roller as it is released by the clamping means and turn the same with the small end down, means for conveying each roller, the smaller end first, away from the turning device and means for ejecting each roller from the feeding device at a predetermined time.

7. A feeding device for feeding taper rollers, including a hopper adapted to contain taper rollers and provided with a channel portion, an elevating screw extending into said channel portion and adapted to convey taper rollers from the hopper through said channel portion thereof, said elevating screw being provided with notches to prevent the rollers from being carried upward in an upright position, clamping means at the upper end of the screw for receiving each roller, means for releasing said clamping means, a turning device adapted to receive each roller as it is released by the clamping means and turn the same with the small end down, means for conveying each roller, the small end first, away from the turning device and means for ejecting each roller from the feeding device at a predetermined time.

8. A feeding device for feeding taper rollers, including a hopper adapted to contain taper rollers and provided with a channel portion, an inclined elevating screw extending into said channel portion and adapted to convey taper rollers from the hopper through said channel portion thereof, said elevating screw being provided with notches to prevent the rollers from being carried upward in an upright position, clamping means at the upper end of the screw for receiving each roller, means for releasing said clamping means, a turning device adapted to receive each roller as it is released by the clamping means and turn the same with the small end down, means for conveying each roller, the smaller end first, away from the turning device and means for ejecting each roller from the feeding device at a predetermined time.

9. In combination with a movable socket, a feeding device for feeding taper rollers including means for positioning each roller with the small end outward, means for placing each roller in the movable socket as the same passes the feeding device, and means for automatically ejecting a roller from the device in the event the same is not properly placed in the socket.

10. In combination with a movable socket, a feeding device for feeding taper rollers including means for positioning each roller with the small end outward, means for placing each roller in the movable socket as the same passes the feeding device, and means adapted to be moved transversely across the path of the rollers after the socket has passed the feeding device for ejecting any rollers which might become accidentally jammed in the feeding device.

11. In combination with a movable socket, a feeding device for feeding taper rollers including means for positioning each roller with the small end outward, means for placing each roller in the movable socket as the same passes the feeding device, and a lever arranged to be automatically moved across the path of the rollers after the socket has passed the feeding device for ejecting any rollers which might become accidentally jammed in the feeding device.

12. In combination with a plurality of movable sockets, a feeding device for feeding taper rollers, including means for positioning each roller with the small end outward, a channel block in which each roller is temporarily held in this position, said channel block having a cut-out portion upon one side, spring means extending across said cut-out portion to normally retain the roller, a plunger for placing a roller in each socket as the same passes in alignment therewith and means adapted to be moved over the channel block from the side opposite to the spring after each operation of the plunger to eject any rollers which might become accidentally jammed in said channel block.

13. A feeding device for feeding taper rollers including a hopper adapted to contain taper rollers, means for removing the rollers from the hopper, a turning device adapted to receive each roller as it is removed from the hopper, said turning device including a reciprocating gate adapted to temporarily support each roller, a fixed member above the gate and a rocker arm spaced from the fixed member adjacent to the end of the gate, said gate and rocker arm being arranged to be operated simultaneously to turn each roller, small end downward and to release the same in this position.

In testimony that we claim the above, we have hereunto subscribed our names.

GEORGE LEE MILLER.
HARRY F. HAINES.